United States Patent [19]

Miescher

[11] Patent Number: 5,616,080
[45] Date of Patent: Apr. 1, 1997

[54] ADAPTABLE SAFETY CLUTCH

[75] Inventor: Stefan Miescher, Eschen, Liechtenstein

[73] Assignee: HiHi Aktiengesellschaft, Furstentum, Liechtenstein

[21] Appl. No.: 502,225

[22] Filed: Jul. 13, 1995

[30] Foreign Application Priority Data

Jul. 25, 1994 [DE] Germany .......................... 44 26 305.8

[51] Int. Cl.$^6$ ....................................................... F16D 7/10
[52] U.S. Cl. .............................................. 464/35; 192/56.1
[58] Field of Search ................................. 192/56.1, 56.5; 464/35, 36

[56] References Cited

U.S. PATENT DOCUMENTS

| | | | |
|---|---|---|---|
| 3,442,360 | 5/1969 | Fulop | 464/35 X |
| 3,552,147 | 1/1971 | Johansson et al. | 192/56.5 X |
| 3,827,260 | 8/1974 | Kato | 464/35 |
| 4,041,729 | 8/1977 | Bilz | 192/56.5 |
| 4,272,973 | 6/1981 | Fu-Tsai | 464/35 X |
| 4,694,944 | 9/1987 | Schmidt | 192/56.5 |

*Primary Examiner*—Richard M. Lorence
*Attorney, Agent, or Firm*—Anderson Kill & Olick P.C.

[57] ABSTRACT

An overload clutch, particularly for use with manually operated drilling tools, has a release or disconnect moment adjusted at a predetermined velocity as a function of the applied torque, whereby in normal, malfunction-free operation the clutch does not release or disconnect. In the case of a malfunction, for instance if the tool is blocked or seized, a rapid rise in the required torque occurs and the clutch, having inertia or damped by a volume change, releases or disconnects and immediately interrupts the torque transmission from the tool motor to the drilling member. A purely mechanical solution for the safe use of such drilling tools is afforded by the provision of a two-part shaft with two co-axially guided shaft parts (3, 7). A drive element (2) is engaged in positively locked manner and acts on a drive side shaft part (7) by a mobile thread or a sliding link (4), so that the drive element (2) prestresses a spring (5) depending on the applied torque.

7 Claims, 4 Drawing Sheets

TRANSMITTED MOMENT

RELEASE

ADAPTABLE SAFETY CLUTCH

BACKGROUND OF THE INVENTION

The present invention is directed to an overload safety clutch, especially for use in manually operated drilling tools, where the torque transmitted from a drive side to a driven side is effected by a connection provided by a prestressed or preloaded spring element.

When using drilling tools, such as a drilling machine, a hammer drill, and diamond tip drilling tools, a large torque can be caused by the material being drilled. The maximum allowed torque for a tool of the type mentioned can be defined relatively accurately. The effect of the torque on the tool and especially in manual tools on the operator can be very different. If the operator stands on a ladder and operates the tool with only one hand, then he produces less opposing moment than if he is standing on the ground and applies pressure with his entire body against the drilling tool. In a hard material being drilled, the torque evidently increases more slowly than in the case when "hitting iron". In unfavorable applications and stability situations a very slight torque change, a reaction moment can result in accidents having severe consequences.

To protect against excessive torque, it has been known to use friction or ratchet clutches representing a compromise between operator and tool protection. However, the result of such compromise, is unsatisfactory, since known overload clutches, if the full output range of the tool is used, can result in accidents, as mentioned above, in view of the reaction moment developed in the drilling tool in the event the drill bit is seized.

To identify the malfunction based on the seizing of the tool bit and to trigger countermeasures in good time, for instance, by interrupting the drive train of the tool with a tool bit by a quick-acting electromagnetic clutch, various solutions have been known to avoid the problem before the operator is injured. As a rule, in electromechanical or mechanolelectronic solutions, where an acceleration component at the tool housing exceeding a predetermined threshold or a velocity component is determined on the basis of the reaction moment by means of a sensor responding to mass effects, such an indication is converted into an electrical signal and used for actuating or releasing the separation clutch. Examples of electromagnetic solutions employing velocity sensors are described in DE 33 46 215 A1 and WO-DE 88-00 109 and/or proposed in a modern solution using acceleration sensors and digital electronics in DE patent application P 43 44 817.8. In these electromechanical or mechanoelectronic solutions, a sensing system checks certain conditions, for instance, the rotational acceleration, a rapidly rising current value, a rising torque and the like. The electronics recognizes the malfunction as soon as the sensor signals excessive specific limit or threshold values and/or because of previously stored process development or operating conditions. The electronics then averts the dangerous consequences of the malfunction by suitable measures, such as uncoupling or braking the drive motor.

All of the known or proposed solutions require, apart from the sensor system, an electronic recognition processing and amplification circuit.

SUMMARY OF THE INVENTION

Therefore, the primary object of the present invention is to provide an economical, purely mechanical solution to the known or proposed electromechanical or mechanoelectronic solutions.

In accordance with the present invention, an overload safety clutch, where the transmission torque between the drive side and the driven side occurs by a connection produced by a prestressed spring, for the adaptation of the disconnect moment as a function drive moment, a drive side or driven side shaft is designed as a two-part shaft with both parts arranged co-axially and rotatable relative to one another, wherein an axial displaceability exists between the drive side shaft part and a drive element engaged in a positively locked manner, so that the prestressed spring presses increasingly or more forcefully against a snap-in means connected with the driven side shaft part in the event of an increasing drive moment.

Compared with known electromechanical or mechanoelectronic solutions, the adaptable overload clutch embodying the present invention is based on a different functional principle. In the present invention, a purely mechanically acting overload clutch is involved where the disconnect or release moment is adjustable. The adjustment of such moment occurs automatically as a function of the respectively acting power torque. The release moment is set up somewhat greater than the existing operational torque, so that in normal operation a disconnect of the overload clutch does not take place.

The drive element incorporating an inert mass or an adaptable dampening device preferably acts through an irreversible mobile thread or by means of a sliding link connection in a positively locked manner on the shaft part of the drive side. As can be noted in the following description, dealing with additional details, it is advantageous to operate the two shaft parts co-axially so that they overlap or telescope one in the other, with the driven side shaft part fitted into the drive side shaft part and the ratcheting or snap-in means formed of balls, rollers or the like arranged in the form of an annular shoulder and retained on the driven side shaft part, with the balls, rollers and the like penetrating through an overlapping end of the drive side shaft part, whereby the prestressed spring presses by means of a pressure ring against the annular shoulder.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DETAILED DESCRIPTION OF THE INVENTION

Figure 1:
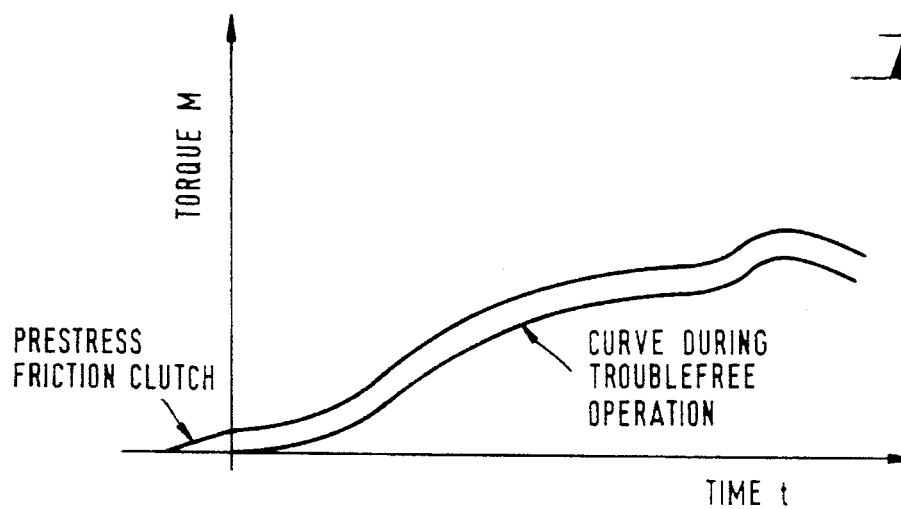
FIG. 1 is a graphical representation comparing the curve during trouble-free operation with the curve of the prestress overload clutch for a drilling tool employing an adaptable safety clutch embodying the present invention.

In the moment-time graph of FIG. 1, the lower curve displays the possible actual course of the torque of a drilling tool operating without malfunction. The upper curve shows the maximum torque which can be transmitted by the adaptable safety overload clutch, wherein the course of the release moment or maximum torque up to the highest allowable value $M_{max}$ (compare FIG. 2) follows the shape of the power torque, because due to the invention, the release moment of the safety clutch follows a selectable or controllable adjustment velocity. It can be noted that the release moment is set somewhat higher than the applied torque, so that no disconnection of the clutch occurs in normal operation, as mentioned above and as can be seen in FIG. 1.

Figure 2:
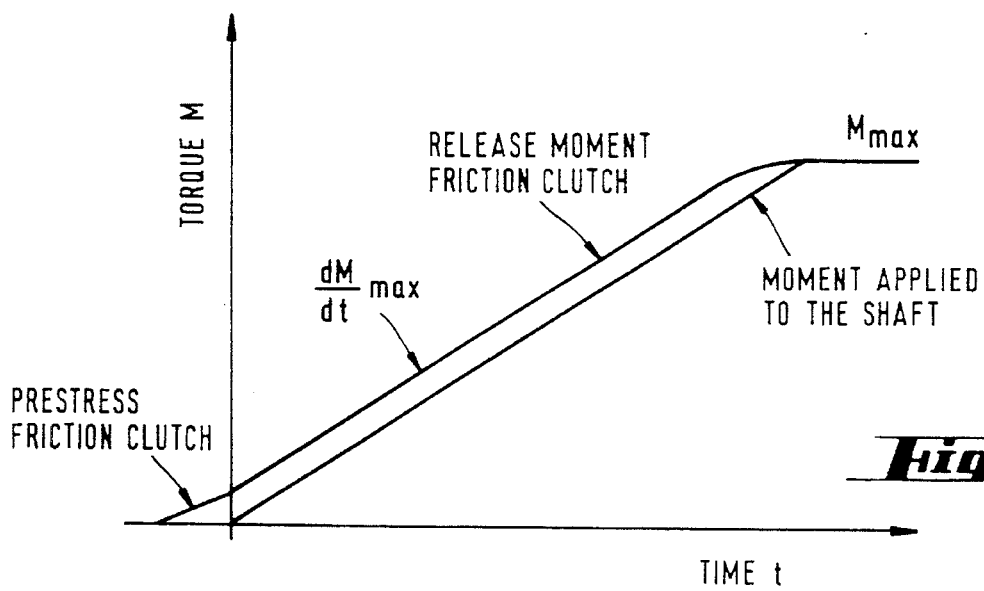
FIG. 2 is a graphical representation of the torque or release moment of the friction clutch in a drilling tool equipped with an adaptable safety clutch embodying the present invention.
Figure 3:
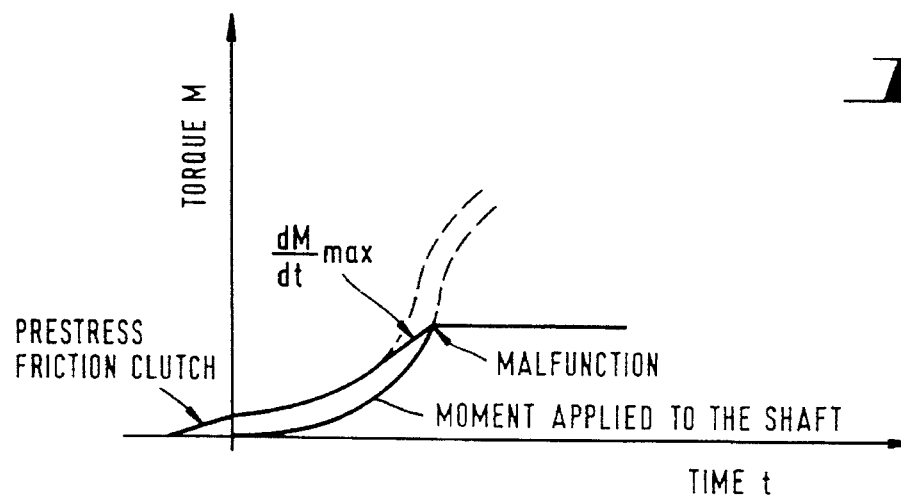
FIG. 3 is a graphical representation of the release of the adaptable friction clutch when a malfunction occurs, for instance, when the drill is seized, and this showing corresponds to the representations in FIGS. 1 and 2.

The adjustment velocity can be limited, as shown in FIG. 2, through specific measures according to the invention to be explained later. If the torque increases faster than the maximum adjustment velocity permits, for instance when the tool bit is seized or jammed, an overshoot of the release threshold occurs before the adaptable overload clutch is able to form an adaptation to the actual situation as represented in FIG. 3. In this malfunction situation, the overload clutch will disconnect and suddenly interrupt the power train from the drive motor to the tool bit, whereby the tool operator is protected.

Figure 4:
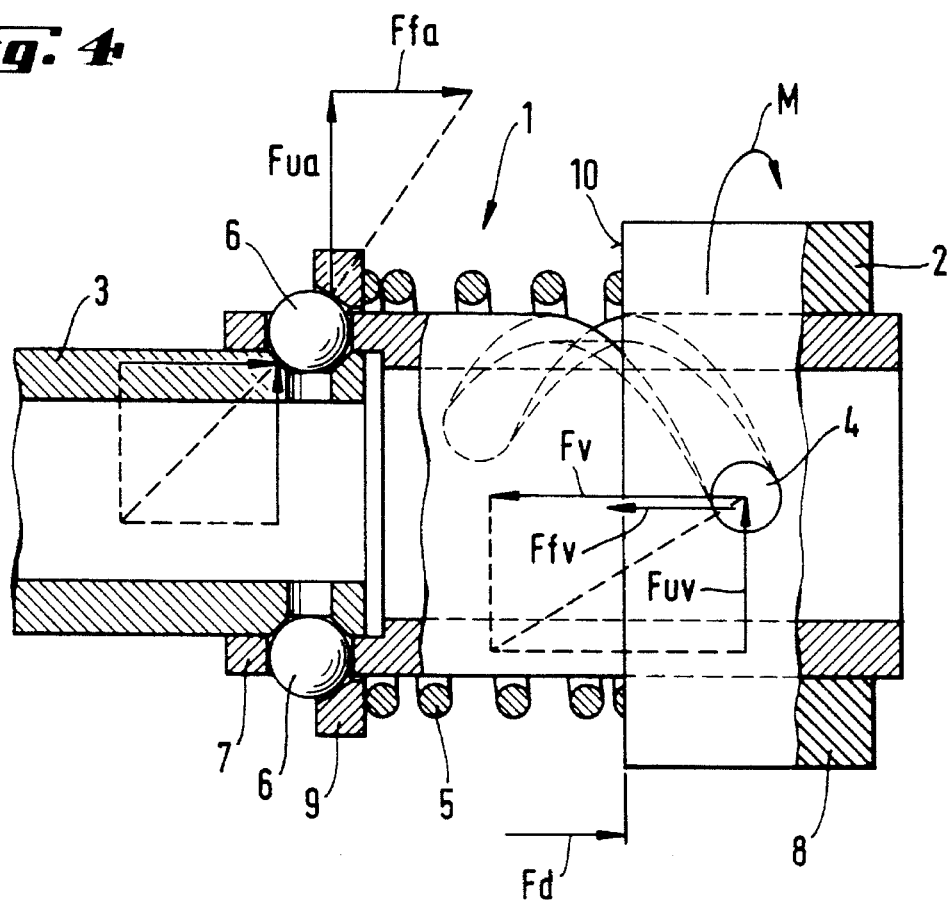
FIG. 4 is a basic illustration representing the operation of an adaptable safety clutch embodying the present invention.

The basic design principle of the inventive adaptable safety clutch 1 is illustrated in FIG. 4. As is known in sliding or ratchet clutches of similar construction, the torque transmission between the drive part 2 (for instance a pinion), and the driven part 3 occurs by a lock produced by a spring 5 prestressed against a holding or snap-in ratcheting means 6. In conventional or ratchet clutches of this type, the release moment or the moment M which can be transmitted remains approximately constant.

In the adaptable sliding overload clutch of the invention, the prestressing of the spring 5 is controlled. For this purpose, the driven or output shaft in the power train for the tool bit, not illustrated, is designed in two parts, it comprises, as shown in FIGS. 4–7, of two axially extending shaft parts arranged co-axially to one another. In the embodiments shown, the driven side shaft part 3 is located within the drive side shaft part 7. The two shaft parts 3, 7 are thus rotatable relative to one another. The drive element 2 (possibly a gearwheel or a guide sleeve 22 as in FIG. 7) engages the drive side shaft part 7 through a mobile thread, a link guide or the like at the drive side shaft part and is designated uniformly as a guide 4. The drive part 2 (gearwheel, guide) presses with an end face 10 facing towards the driven side shaft part 3 along with the tool bit against the spring 5, and thus the spring is pressed to a greater or lesser extent against the stop or the snap-in ratchet means 6 which is connected with the driven side shaft part 3, as a component of the turning motion acting through the guide 4 due to the axial displaceability between the drive side shaft part 7 and the drive element 2, depending on the acting torque M. Because of the relative axial displaceability of the element 2 and the part 7 with respect to one another, because of the guide 4, the spring is stressed to a greater or lesser degree by the applied torque and thus the releasing moment of the overload clutch is set up in adaptation to the moment desired at the driven side shaft part 3.

Several force-vector diagrams are shown in the basic illustration of the adaptation overload clutch 1 of the invention as illustrated in FIG. 4, displayed as axially or circumferentially acting force components at specific effective points of the clutch for a specific acting torque M.

Figure 4A:
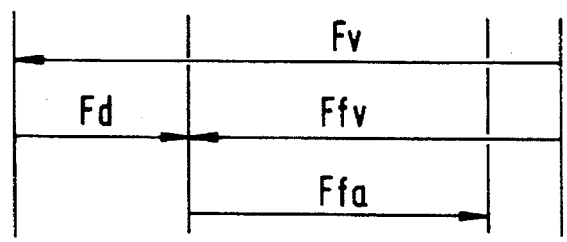
FIGS. 4a and 4b are diagrammatic vector representations of individual force-axial components.

To clarify the force or moment transmission behavior of the adaptable clutch system in FIG. 4 in the case of moment transmission, that is when operating without malfunction, (note FIG. 1) or at the moment of release (note FIG. 3), two vector diagrams (FIGS. 4a, 4b) of individual force/axial components are shown diagrammatically and are explained as follows.

The force components acting on the adjustment or drive element 2 due to the moment can be resolved into an axial adjustment force Fv and a circumferential force Fuv. The axial component Fv is counteracted by an inertia or dampening force Fd. The force component Fd differs in magnitude depending on the operating situation, it remains approximately constant during operation without malfunction as shown in FIGS. 1 and 2 as well as in the vector diagram in FIG. 4a. The axial force Ffv transmitted to the spring 5 results in Ffv=(Fv–Fd). A computable spring force Ffa results, based on the Moment at the snap-in means in the moment transmission, acts on the driven side shaft part 3 through which the snap-in means effects the moment transmission between the shaft parts 3, 7 occurs. The circumferential force at the snap-in mechanism is designated by Fua. The size of the spring force axial component Ffv is changed according to the basic principle of the invention by means of the relative axial displacement of the drive element 2 by means of the guide 4 (sliding link) shown diagrammatically in FIG. 4.

Figure 4B:
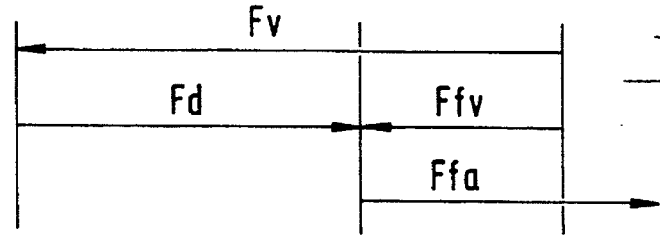

In the case of a malfunction, for instance in an "iron strike", the driven side shaft part 3 is seized or blocked. Due to mass inertia or an installed dampening device, the spring force component Ffv cannot follow the necessary torque rise. The axially acting inertia or dampening component Fd increases suddenly, so that the axial force component Ffa is no longer adequate for transmitting the force due to the pronounced increase of the moment required at the driven side shaft part 3 and thereby releases the clutch mechanism between thrust pressure ring 9 and the snap-in means 6, so that the transmission of torque from the tool drive to the driven side shaft part 3 is suddenly interrupted (FIG. 4b).

Figure 5:
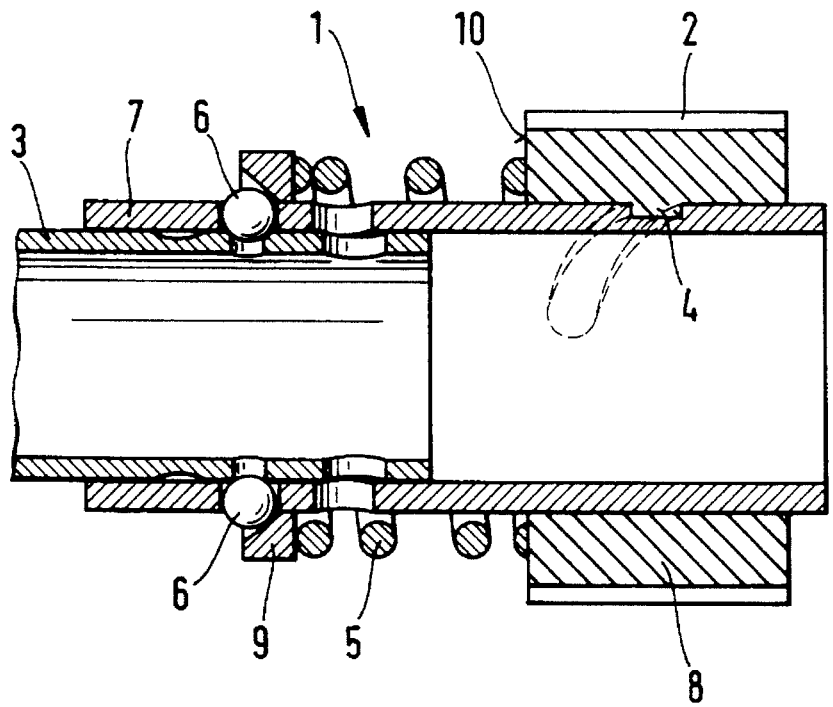
FIGS. 5 and 6 each show an embodiment of an adaptable safety clutch of the type embodying the present invention.
Figure 6:
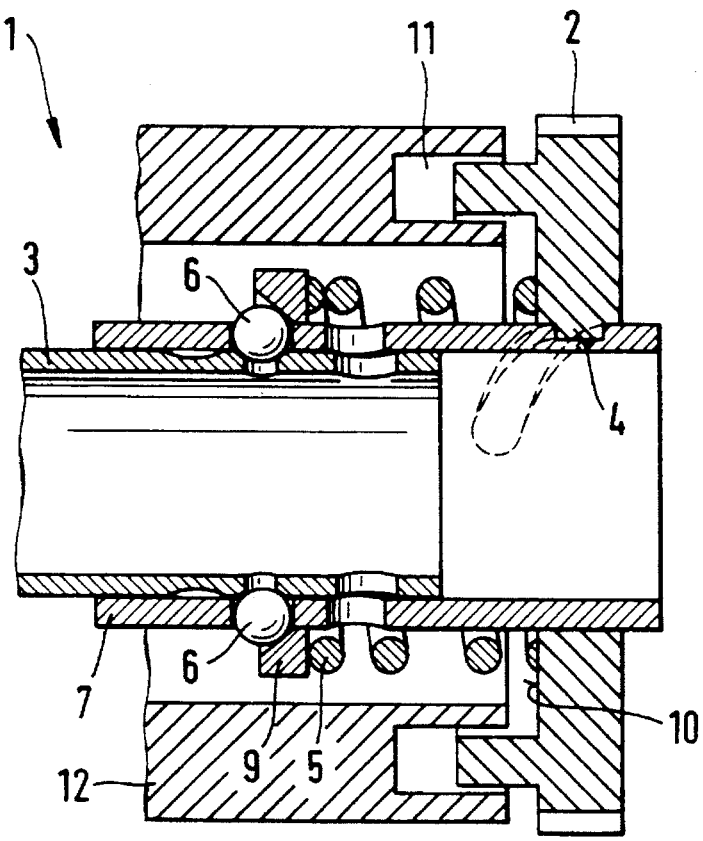

As shown in FIGS. 5 and 6, the retaining or snap-in means 6 for the spring 5 on the driven side shaft part 3 can be formed by a spring preloaded ball collar supported in the outside surface of the driven side shaft part 3, which penetrates the overlapping hollow shaft section of the drive side shaft part 7 and serves as an abutment for a pressure or thrust ring 9 having a chamfered surface acting against the balls of the snap-in means 6 and the end of the prestressed spring 5 presses against the thrust ring 9. The locked clutch with adaptable adjustment by varying the prestress on the spring 5 is provided between the chamfered inside surface of the thrust ring 9 and the balls of the retaining or snap-in means 6 supported in the driven side shaft part 3. A force transmission is possible in similar designs by means of rollers, rolls, or a set of teeth releasing as a function of torque or by means of a purely locked connection.

As mentioned above, the arrangement of the adaptable clutch system is to enable a release moment which is higher than the applied torque. As discussed, this takes place by relative axial displacement between the drive element and the drive side shaft part 7 with simultaneous variable adjustment of the locked clutch connection by torque-dependent prestress of the spring 5. As a result, it is assured that the frictional overload clutch is subsequently prestressed in the normal case of increasing torque instead, as is the case in such clutches in the state of the art, of releasing or disconnecting at a specific torque.

In the invention the displacement velocity for the adjustability of the torque is limited, and can be achieved by designing the adjustment or by having the drive element 2 provided with a specific mass 8 affording a mass inertia. Alternatively, the drive element 2 can be provided with a dampening device 11 for volume displacement as shown in FIG. 6, which becomes effective, if necessary, only beginning with a specific drive moment. In FIG. 6, the dampening component 12, shown schematically, is integral with the housing.

Figure 7:
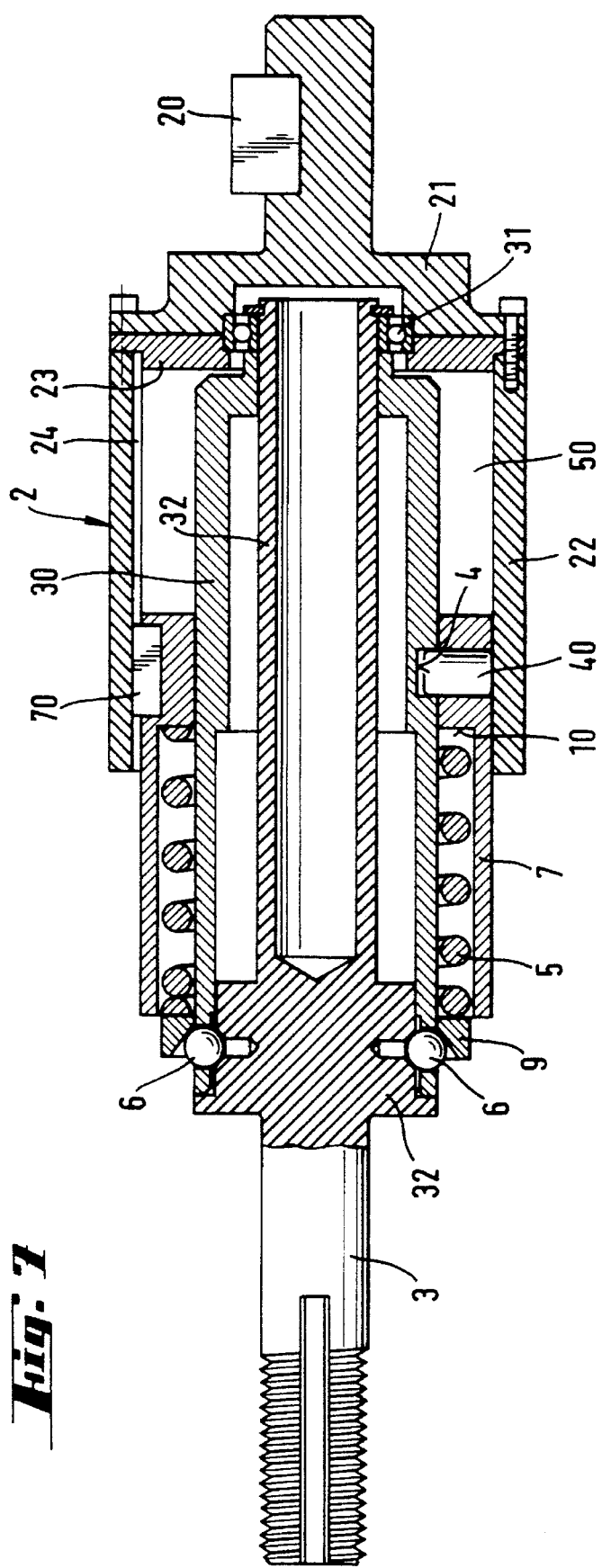
FIG. 7 is an axially extending sectional view illustrating a proven actual embodiment of an adaptable safety clutch embodying the present invention.

The proven and tested laboratory embodiment of the inventive adaptable safety clutch is shown in FIG. 7. In this embodiment, the drive element 2 comprises a splined shaft 20 with a flanged attachment 21 with a bolted counterflange 23 for the internal side retention of a ball bearing 31, for the driven side shaft part 3 secured by the same bolts with a guide sleeve 22 for effecting the transmission of torque. The guide sleeve 22 has a slide groove 24 on its inside surface in which an entrainment wedge 70 is engaged so that it is displaceable in the axial direction. The wedge 70 is solidly connected with the drive side shaft part 7, shaped as an adjustment ring or sleeve. The axial displacement of the shaft part 7 formed as an adjustment ring is effected by the guide 4 (sliding link) in which a slide lug 40, connected with the adjustment ring, engages. An axially extending volume of air 50 is located within the guide sleeve 22 between the internal surface of the flange portion 23 and the oppositely located end face of the adjustment ring 7 with the volume of air serving as a dampening agent.

As in the case of the two embodiments described and illustrated in FIGS. 5 and 6, the snap-in means 6 against which the thrust ring 9 abuts, is shaped as a ring of spring preloaded balls which on one hand abut against a hollow shaft-like core section 32 of the driven side shaft part 3 and on the other hand penetrate a surrounding sleeve section 30, in which the guide 4 (sliding link) is located.

The purely mechanical solution of the invention for protecting the operator in manually operating drilling tools against the consequences of an unexpectedly strongly increasing reaction moment by means of an adaptable safety overload clutch with a self-adjusting release moment provides, with high operational security, an advantageous alternative in many cases to the previously mentioned mechanoelectronic or electromechanical solutions of the problem.

While specific embodiments of the invention have been shown and described in detail to illustrate the inventive principles, it will be understood that the invention may be embodied otherwise without departing from such principles.

I claim:

1. An overload clutch disposed in between a driving member and a driven element for transmitting torque comprising a clutch member which is loaded by a prestressed spring, one of said driving member and said driven element comprising two shaft parts arranged coaxially and being connected for rotation by said clutch member as long as the transmitted torque is below a threshold value, and being rotatable relative to one another when the torque instantaneously exceeds the threshold value, said driving member comprising a drive element being connected for rotation with one of said two shaft parts and having an end face for supporting an end portion of said prestressed spring, another end portion of said prestressed spring pressing against said clutch member, said drive element being axially displaceable relative to said one shaft part as the torque transmitted by said drive element increases, thereby increasingly pressing said prestressed spring against said clutch member for raising the threshold value.

2. An overload clutch, as set forth in claim 1, wherein one of said drive element (2) and said one shaft part (7) having an inertia mass (8) such that the axial displacement of said drive element relative said one shaft part occurs slower than the increase of torque due to sudden blocking of the other of said two shaft parts.

3. An overload clutch, as set forth in claim 1, wherein means are provided for dampening the axial displaceability of said drive element (2) relative to said one shaft part (7).

4. An overload clutch, as set forth in one of claims 1, 2 or 3, wherein said drive element (2) and said one shaft part (7) cooperates via a guide (4).

5. An overload clutch, as set forth in claim 4, wherein said guide (4) comprises a groove in said one shaft part, said groove being engaged by a lug protruding from said drive element.

6. An overload clutch, as set forth in one of claims 1, 2 or 3, wherein said one shaft part (7) and said other shaft part (3) are co-axially guided with one of said shaft parts overlapping the other and with said other shaft part (3) fitted into said one shaft part (7).

7. An overload clutch, as set forth in one of claims 1, 2 or 3, wherein said clutch member (6) comprises a ring collar formed of one of balls, and rolls, and said prestressed spring (5) presses by means of a thrust ring (9) against said ring collar.

* * * * *

UNITED STATES PATENT AND TRADEMARK OFFICE
CERTIFICATE OF CORRECTION

PATENT NO. : 5,616,080
DATED : April 1, 1997
INVENTOR(S) : Stefan Miescher

It is certified that error appears in the above-indentified patent and that said Letters Patent is hereby corrected as shown below:

Title page, item [73], Assignee: should read-- Hilti Aktiengesellschaft, Fürstentum, Liechtenstein--

Signed and Sealed this

Twenty-first Day of October 1997

Attest:

BRUCE LEHMAN

*Attesting Officer*    *Commissioner of Patents and Trademarks*